(12) United States Patent
Yin et al.

(10) Patent No.: US 11,062,371 B1
(45) Date of Patent: Jul. 13, 2021

(54) DETERMINE PRODUCT RELEVANCE

(71) Applicant: A9.com, Inc., Palo Alto, CA (US)

(72) Inventors: Bing Yin, Fremont, CA (US); Francois Huet, Santa Cruz, CA (US); Christopher Varano, Redwood City, CA (US)

(73) Assignee: A9.com, Inc., Palo Alto, CA (US)

( * ) Notice: Subject to any disclaimer, the term of this patent is extended or adjusted under 35 U.S.C. 154(b) by 1293 days.

(21) Appl. No.: 14/960,222

(22) Filed: Dec. 4, 2015

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0641* (2013.01)

(58) Field of Classification Search
CPC .............. G06Q 30/0625; G06Q 30/0641
USPC ................................. 705/26.1–27.2
See application file for complete search history.

(56) References Cited

U.S. PATENT DOCUMENTS 8,838,587 B1 * 9/2014 Adams ................ G06F 16/9535
707/731

OTHER PUBLICATIONS

Strohman, T., Metzler, D., Turtle, H., Croft, W. B. Indri: A language model-based search engine for complex queries. In Proceedings of the International Conference on Intelligence Analysis, 2005. (Year: 2005).*

* cited by examiner

*Primary Examiner* — Anand Loharikar
(74) *Attorney, Agent, or Firm* — Hogan Lovells US LLP

(57) ABSTRACT

The arrangement and selection of digital content to present to a user can be based at least in part upon probabilities of the user selecting to view more information and/or entering into a transaction with respect to instances of the content. For example, user behavior with respect to various items provided through a content provider can be determined in order to calculate a probability that a user was searching for a particular type of item for a given search. The user behavior can include historical action data, such as information that indicates items that were selected in response to a particular search and/or items that were purchased in response to a particular search. The historical action data can be analyzed to generate an index that indicates a likelihood that the search was intended for a particular type of product. Additionally, the historical data can be used to train language models that can be used to determine a probability of interest for a particular type of product for a given search. Once a query is received, items of interest can be determined using one of the index or language models, and those items can be presented to the user.

20 Claims, 7 Drawing Sheets

DETERMINE PRODUCT RELEVANCE

BACKGROUND

Users are increasingly utilizing electronic devices to research, locate, and obtain various types of information. For example, users may utilize a search engine to locate information about various items, such as items offered through an electronic marketplace. Some search approaches use natural language parsing on search terms to determine the intent of a user's search. However, these approaches can be computationally intensive and may require substantial resources and/or time to implement. Further, these search approaches do not always present items to a user that are of interest to the user. Further still, providing the user with items that are more likely to be of interest to the user can result in higher profitability or other favorable results for the provider of those items.

BRIEF DESCRIPTION OF THE DRAWINGS

Various embodiments in accordance with the present disclosure will be described with reference to the drawings, in which.

DETAILED DESCRIPTION

Figure 1A:
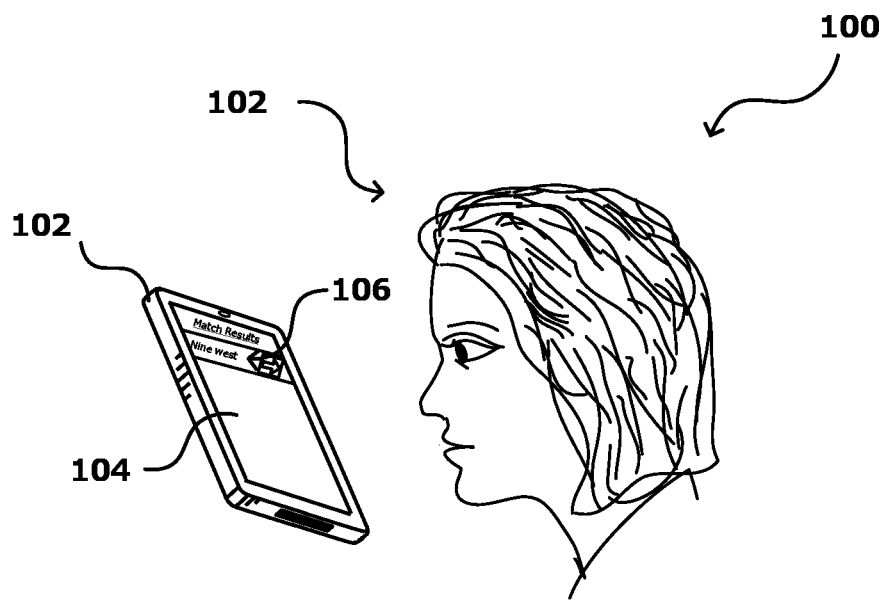
FIGS. 1A and 1B illustrate example search results for various items that can be presented to a user in accordance with various embodiments.

Systems and methods in accordance with various embodiments of the present disclosure may overcome one or more of the aforementioned and other deficiencies experienced in conventional approaches to determining content to provide to a user. In particular, various embodiments attempt to determine the types of items to display to a user in response to a search query.

For example, user behavior with respect to various items provided through an electronic marketplace can be determined in order to calculate a probability that a user was searching for a particular type of item for a given search. The user behavior can include historical action data, such as information that indicates items that were selected in response to a particular search and/or items that were purchased in response to a particular search. The historical action data can be analyzed to generate an index that maps searches to one or more types of products, where each of these mappings is associated with a probability that indicates the likelihood that the search was intended for a particular type of product. Additionally, the historical data can be used to train language models that can be used to determine a probability of interest for a particular type of product for a given search.

In various embodiments, when a search is received for an item offered through an electronic marketplace, the index can be analyzed to determine whether there is sufficient data for a particular query. In the situation there is sufficient data, information about a product type identified using the query can be utilized to determine search results of items that can be provided to a user. Additionally or alternatively, the information can be provided to an item ranking function used to rank items for display. In the situation where there is not sufficient data for a particular query, the search can be analyzed using different language models to identify one or more product types. Thereafter, information about the product types can be utilized to determine search results that can be provided to a user, or the information can be provided to an item ranking function used to rank items for display.

In accordance with various embodiments, such approaches allow for providing items that the user will be more likely to view and/or purchase, in order to improve the user experience and help the user more quickly locate items of interest. In addition to providing items responsive to a query, such an approach can improve the user experience by enabling the user to instantly obtain information for multiple items that are likely to be of interest to the user upon accessing a website or other grouping of content, improving the user's overall impression of that site. In addition to improving the user experience, showing items that are more likely to result in views and/or transactions can improve the revenue for the provider of the items, or other such party or entity. As additional data for is gathered, such as through users selecting and/or purchasing items in response to a particular query, the index and language models can be updated accordingly. The updated index and/or language models can be used to determine the items to present to a user, and the arrangement of those items, which can improve the overall user experience while increasing profit for the provider of those items.

Various other functions and advantages are described and suggested below as may be provided in accordance with the various embodiments.

Figure 1B:
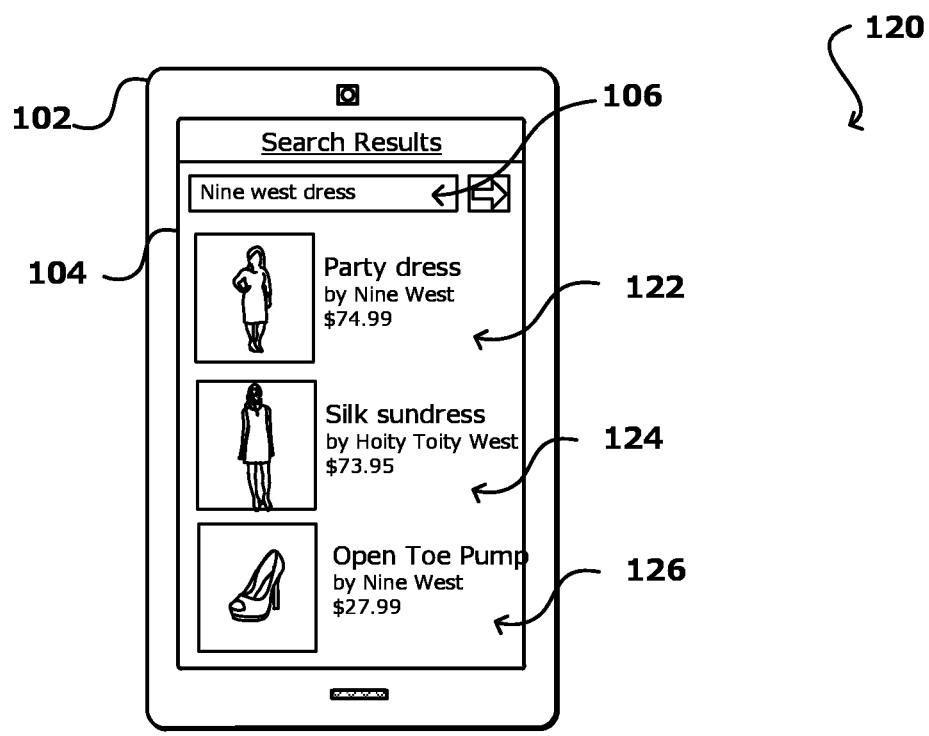

FIG. 1A illustrates an example situation 100 in which an interface on a display screen 104 of a computing device 102 can be used to search for items provided through an electronic marketplace. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, a user has entered a search query 106 that causes a set of search results (e.g., search results 122, 124, and 126) to be displayed on the display screen 104 as shown in example 120 of FIG. 1B. In this example, however, although the user searched for a particular product type, "dress," by entering the query "Nine west dress," the user is provided search results relating to both dresses and shoes. As such, the user is not being provided relevant items to their query. Various other approaches may obtain a similar set of results, or similar display of items, such as when the user navigates to a page corresponding to that type of content. However, while such approaches can be very useful and beneficial for users in many instances, there are ways in which the exposure of the user to items of interest can be improved. For example, in a search context, users might want to be able to view content that is responsive to their search query. The ability to display items responsive to a user's query can help the provider of the items, as the profit and/or revenue to the provider will increase if items of greater interest to the user are provided. Accordingly, systems and methods in accordance with various embodiments can address these and other concerns by providing a data-driven search approach that provides a user items that are likely to be responsive to a particular query. Such an approach can improve the likelihood of clicks, purchases, and revenue to the provider of those items.

Figure 2:
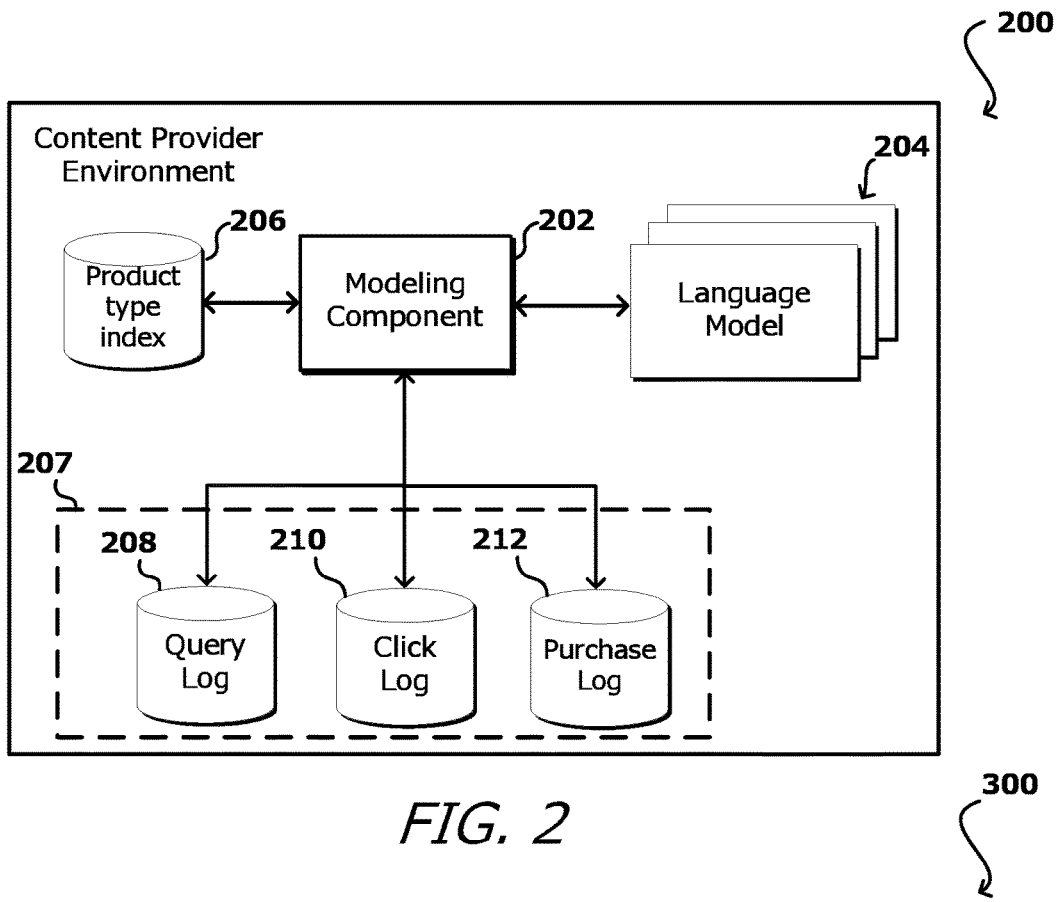
FIG. 2 illustrates an example system that can train a language model and generate a product type index that can identify items that can be provided to a user in accordance with various embodiments.

The situation 200 illustrated in FIG. 2 provides an example of a system that can be utilized to train language models and/or a product type index that can be used to identify items responsive to a user's search query. In this example, a modeling component 202 or other such component, service, etc. can be used to train one or more language models 204 and generate a product type index 206. To generate the product type index 206 or other such index, the modeling component 202 analyzes historical action data 207 to determine a record of a number of occurrences one or more items were selected, purchased in response to a particular query, placed in an electronic shopping chart in response to the query, or other action showing some level of interest in an item in response to the query. Using the historical action data, a product type is identified that is responsive to a particular query, and the query that caused the action (e.g., selected, purchased, etc.) is mapped to the appropriate product type. This relationship is stored in the product type index 206.

In accordance with various embodiments, historical action data can include the data in a query log 208 stored in a query log database, data in a click log 210 stored in a click log database, and data in a purchase log 212 stored in a purchase log database. Although these databases are shown as separate databases, it should be noted that the data in each of these databases can be part of a single database or spread across a plurality of databases. The query log 208 includes a log of a plurality of queries for items. The queries can include searches for items provided through the electronic marketplace and typically include words and/or numbers used to search for a particular item. An example query can be "nine west dress women," where the query is intended to retrieve items related to dresses provided by the brand Nine West for women. The click log 210 includes a log of items selected in response to a particular query. For example, in the situation where the query is "nine west dress women" and a dress is selected (or "clicked on") in response to the query, a record of the selected dress is entered in the click log. The purchase log 212 includes a log of items purchased in response to a particular query. For example, in the situation where the query is "nine west dress women" and a dress is purchased in response to that query, a record of the purchased dress in response to that query is entered in the click log. For either the record for the click log or the record for the purchase log, the record can include the query terms used in the query and the corresponding action (e.g., click or purchase) resulting from the query. It should be noted that other information can be used as historical action data as one skilled in the art would identify.

The index maps each query to at least one product type, where each mapping can be associated with a product type probability. A product type probability can include one of, or a combination of, a click probability, a purchase probability, an action probability (i.e., a probability of an action showing some level of interest in an item in response to the query.) In the situation where just a click probability is determined (or used), the product type probability is based on the click probability. Similarly, in the situation where just a purchase probability is determined (or used), the product type probability is based on the purchase probability. In the situation where both probabilities are determined (and used), the product type probability can be a combination of the two probabilities, where value of the click probability can be combined with the value of purchase probability in any number of ways.

Determining a product type probability can include determining a ratio of a number of instances of a particular product type selected and/or purchased for a query to a total number of instances of product types selected and/or purchased for the query. For example, items can be associated with a product document. The product document can include structured text data that includes at least a product type field that indicates a product type associated with a respective item. Example product types include, for example, pants, dresses, shoes, hats, etc. Given the query "nine west dress women" and assuming the historical data indicates that the query resulted in 1000 dresses (i.e., product type dress) being selected and 100 shoes (i.e., product type shoe) being selected, the click probability for dresses for the query is the ratio of the number of times a dress was selected over the total number of instances of product types selected (i.e., dresses and shoes). In this example, the click probability is about 0.91 or 91 percent. In the situation where only the click probability is used, the product type probability is that of the click probability. In the situation where purchase probability was available, the product type probability can include a combination of the probabilities for the particular user or a general user, as may be based upon historical click data and historical purchase data for the particular user and/or other users for a given query.

In accordance with various embodiments, the modeling component 202 can be used to train a plurality of language models based at least in part on the historical action data (e.g., the data included in the query log, the click log, and the purchase log). A language model can be of any word length. Example language models include one word language models (unigram), two word language models (bigram), three word language models (trigram), etc. Language models can be associated with a weighting factor. The weighting factors associated with the language models can be different, the same, or a combination thereof. For example, the weighting factor associated with a three-word word set can be associated with a first weighting factor, probabilities associated with a two-word word set can be associated with a second weighting factor, and probabilities associated with a one-word word set can be associated with a third weighting factor. In accordance with an embodiment, the first weighting factor can be greater than the second weighting factor, and the second weighting factor can be greater than the third weighting factor. Training the language models can include determining a weighting factor for a respective language model. For example, the historical data can be analyzed using, for example, a neural network to determine an appropriate weighting factor for each of the language models. As will be apparent to persons of reasonable skill in the art, training a language model is well known and such approaches will not described further herein.

Figure 3:
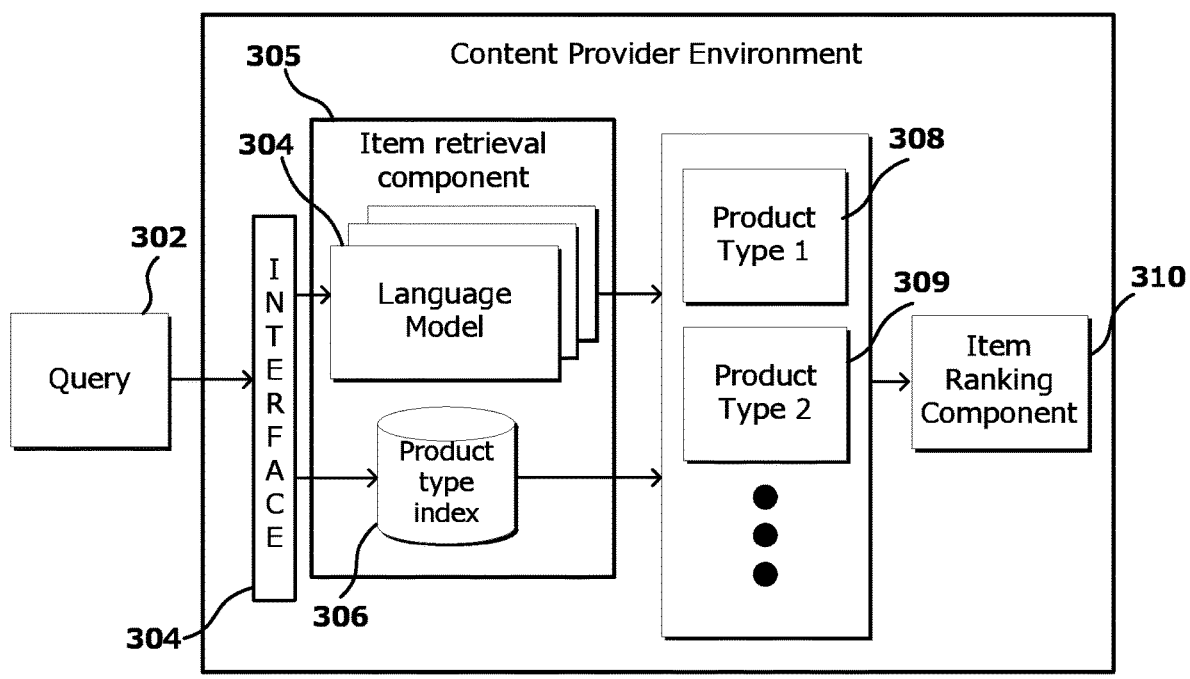
FIG. 3 illustrates an example system that uses at least one language model and/or a product type index to determine items that can be provided to a user in accordance with various embodiments.

FIG. 3 illustrates an example system 300 that uses at least one language model and/or a product type index of an item retrieval component (e.g., a search engine, etc.) to determine to determine items (e.g., dresses, pants, shirts, glasses, etc.) that can be provided to a user in accordance with various embodiments. In this example, a query 302 received to the content provider environment can be received by an interface layer 304 of the environment. As known for network environments, the interface layer can include components such as interfaces (e.g., APIs), load balancers, request and/or data routers, and the like. The query is directed to an item retrieval component 305 configured to retrieve items responsive to the query. The item retrieval component includes one or more language models 304 and a product type index 306.

The query can be compared to a frequency threshold. The frequency threshold is used to determine whether there is sufficient historical action data for a particular query. In the situation where the query satisfies the frequency threshold, the query can be compared to queries in the product type index. In the situation where a match is determined, the product type index can be used to identity a product type associated with the query. The probability associated with the product type can be identified and information about the product type as well as the associated probability can be used to determine items that can be provided to a user. In one example, the information can be provided to a search engine that can retrieve items based at least in part on the query. In another example, the information can be provided to an item ranking function used to rank items for display. For example, in the situation where the query is "nine west dress women," a mapping between the query and at least one product type can be identified. The mapping can include a mapping between the query and one or more product types (e.g., one of 308 or 309). The mapping can be associated with a product type probability and the product type as well as the associated probability can be provided to an item ranking component 310 that includes an item ranking function used to rank items that are provided to a user.

In the situation where the query does not satisfies the frequency threshold (e.g., there is insufficient historical action data for the query), the query can be analyzed using one or more language models to determine one or more product types, each product type being associated with a product type probability. For example, the query "nine west dress women" can be segmented into word sets, where each word set can be one, two, three, etc. words in length. Language models matching the word set lengths can be used to determine a probability for a product type for each of the word sets. Thus, if the word set is one word in length a unigram language model is used, if the word set is two words in length a bigram language model is used, and so on. Taking the query "nine west dress women," the query can first be segmented into two, three-word word sets. In this example, the two, three-word word sets would include "nine west dress" and "west dress women." Trigram language models are used to determine a probability for product types for each of the two, three-word word sets. In accordance with an embodiment, the probability for each of the product types can be compared to a product type probability threshold. Assuming that the word set "nine west dress" is associated with a product type having a product type probability that satisfies the product type probability threshold, and the word set "west dress women" is associated with a product type having a product type probability that does not satisfy the product type probability threshold, the word set "west dress women" is segmented into two, two-word word sets.

The two, two-word word sets include "west dress" and "dress women," and are used to approximate a probability for "west dress women." The process described is repeated for these word sets using bigram language models. If one of the word sets is not associated with at least one product type probability that satisfies the product type probability threshold, that word set is segmented into one-word word sets and the process is repeated using unigram language models.

Language models can be associated with a weighting factor. The weighting factors associated with the language models can be different, the same, or a combination thereof. For example, the weighting factor associated with a three-word word set can be associated with a first weighting factor, probabilities associated with a two-word word set can be associated with a second weighting factor, and probabilities associated with a one-word word set can be associated with a third weighting factor. In accordance with an embodiment, the first weighting factor can be greater than the second weighting factor, and the second weighting factor can be greater than the third weighting factor. Training the language models can include determining a weighting factor for a respective language model. For example, the historical data can be analyzed using, for example, a neural network to determine an appropriate weighting factor for each of the language models.

In various embodiments, the query can be segmented into available language models. In the example of three language models, the query "nine west dress women" is segmented in three, two, and one word language models regardless of any associated product type probability. In either situation, the probabilities for each of the word sets can be combined. For example, assuming the query "nine west dress women," there is a first three-word word set and a second three-word word set. The first three-word word set can be associated with at least one product type having a product type probability that satisfies a product type probability threshold. The second three-word word set is not associated with at least one product type having a product type probability that satisfies the product type probability threshold. The second three-word word set can be segmented into a first and a second two-word word set. Assuming the first two-word word set is associated with at least one product having a product type probability that satisfies the product type probability threshold, the second two-word word set is segmented into a first and a second one-word word set. Assuming the first one-word word set is associated with at least one product having a product type probability that satisfies the product type probability threshold, combining the probabilities can include combining the probabilities of the product types associated with the first three-word word set, the first two-word word set, and the first one-word word set. The probabilities can be combined in any number of ways as is known in the art. For example, the probabilities can be combined using a log space function or other such function.

Thereafter, in accordance with an embodiment, information about the product type(s) and associated product type probability can be used by a search engine to identify items that can be provided to a user. In various embodiments, the information can be provided to the item ranking component 310, recommendation engine, or other such component, and the information can be used to rank or otherwise order the items such that items that are more likely to be purchased, or at least viewed, by the user are presented first, in order to enable the user to more quickly and easily locate content of interest. Such an approach can result in a greater likelihood of the user "clicking on" or otherwise selecting one of the items, as well as a greater likelihood of the user consuming (i.e., purchasing, renting, downloading, or otherwise obtaining) one of the items.

Figure 4:
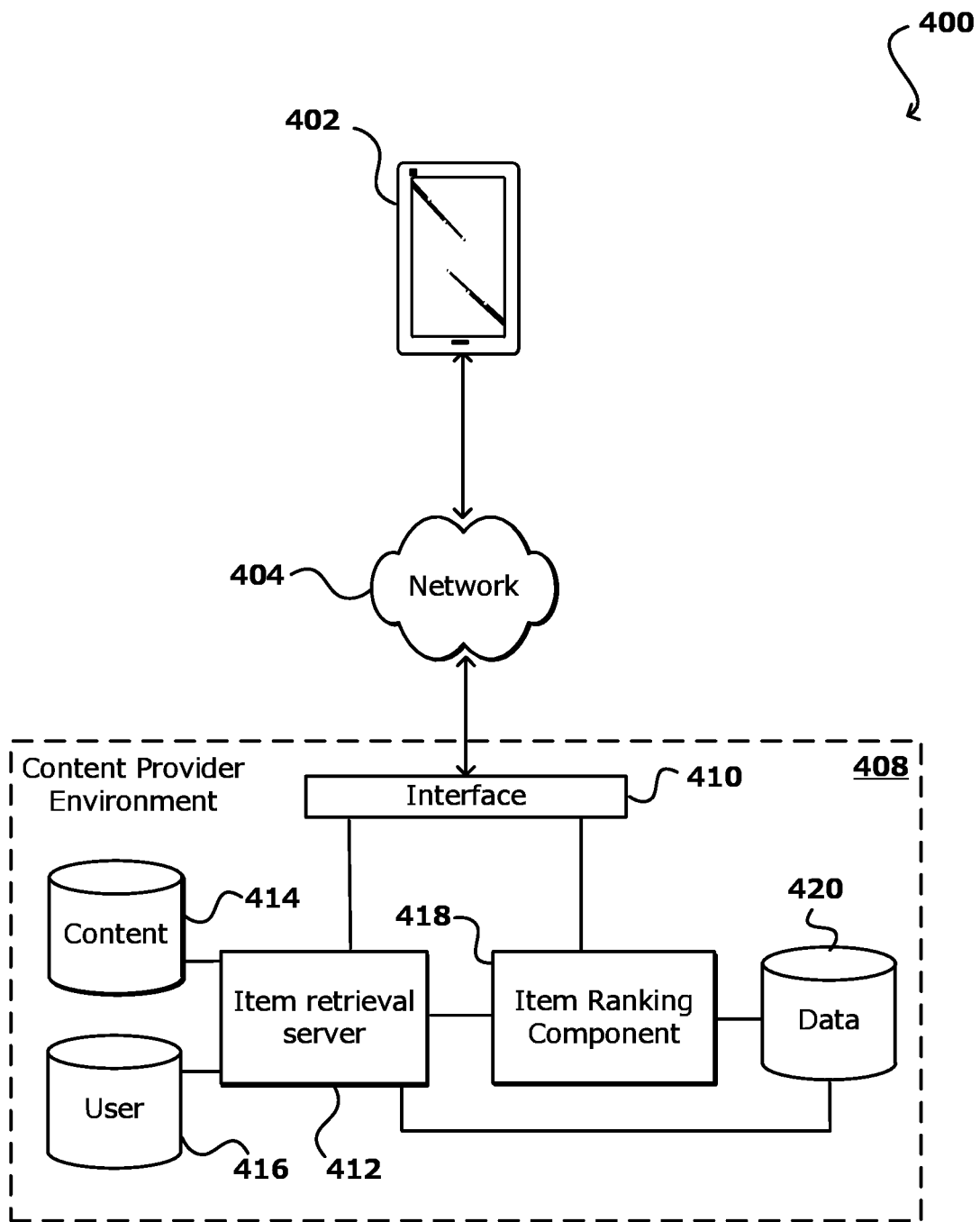
FIG. 4 illustrates an example system that can be used to determine items that can be provided to a user in accordance with various embodiments.

FIG. 4 illustrates an example environment 400 that can be used to implement aspects in accordance with various embodiments. In FIG. 4, a client computing device 402 can submit a query for content across at least one network 404 to be received by a content provider environment 408, such as an electronic marketplace. The content can include items that can be consumed through the content provider environment. In this example, a query received to the content provider environment 408 can be received by an interface layer 410 of the environment. As known for network environments, the interface layer can include components such as interfaces (e.g., APIs), load balancers, request and/or data routers, and the like. If the query is a request for items for purchase, information for the query can be directed to one or item retrieval servers 412, which can obtain the content from a content data store 414 or other such repository to be sent back across the network(s) to the computing device. In some embodiments, information for the query might also be compared against user data in a user data store 416 or other such location do determine, for example, whether the user has access rights to those items. In one example, the items can include items of interest to consume, a plurality of images to be displayed as part of a set of search results or set of potential items of interest, although various other types of content and uses for images can be utilized as well within the scope of the various embodiments.

In accordance with an embodiment, when content is to be provided to a user, the item retrieval server 412 in this example can contact an item ranking component 418, or other such system or service, in order to determine which items are to be provided, and in what order. For example, when a query is received for an item, the item retrieval server 412 can analyze an index of products (not shown) to determine whether there is sufficient data for the query. In the situation where the query satisfies a frequency threshold, the query can be compared to queries in the product type index. In the situation where a match is determined, the index can be used to identity a product type associated with the query. Information about the product type can be provided to the item ranking component. In the situation where the query does not satisfies the frequency threshold (e.g., there is insufficient historical action data for the query), the query can be analyzed using language models to determine an appropriate product type associated with the query, and information for the appropriate product type can be provided to the item ranking component.

In one example, a page of content might display images for apparel items that the user can purchase. In order to determine which of the items the user is most likely to view or purchase, the item ranking component can look at the probabilities associated with the product types determined from the query. Along with the probabilities, the item ranking component 418 can obtain revenue, profit, and/or other financial data for the items to potentially be displayed to the user. This can include financial data from a data store 420 or other such location. The item ranking component can consider information such as the amount of profit that would be generated through the sale of each item, the amount of ad revenue for a click or selection by the user, a cost to store the item, and/or other such data. The item ranking component can also look at the probabilities and the financial data for the various items to determine which items to display to the user, and the order in which to display those items, based thereon. This can include, in some embodiments, the items most likely to be viewed and/or purchased by the user, while in other embodiments can include the items most likely to generate profit for the provider, supplier, or other such party based at least in part upon the items most likely to be viewed or purchased along with the relevant profit for each.

Once a ranking and/or selection is determined, the data can be passed to the content server item retrieval server in this example, which can generate the appropriate code or otherwise cause the corresponding items to be provided in content for the user. This can include, for example, generating HTML to be rendered in a browser application on the client device to enable images for the items to be displayed in an arrangement based at least in part upon the determined ranking. In some embodiments a diversity component can be part of, or installed in, the content server, while in other embodiments it can be a separate component or service that may be called by the content server, among other such options.

In accordance with an embodiment, when information for a new item is received, information in regard to the product type and probability can be determined once sufficient historical action data is obtained. It should be understood that not every item will have sufficient historical action data to be actionable as an entry in the product type index or with one or more language models, but the probabilities can be based at least in part upon the information available. An appropriate probability model, such as a beta-Bernoulli or Bayesian regression model, can be used to gather the values for the various historical data actions and generate the probabilities for both clicks and conversion for various items and/or content with respect to a user (or group of users, etc.). Such a model can also provide an uncertainty, or variance, which can be used to assist in the rankings of the various items.

Figure 5:
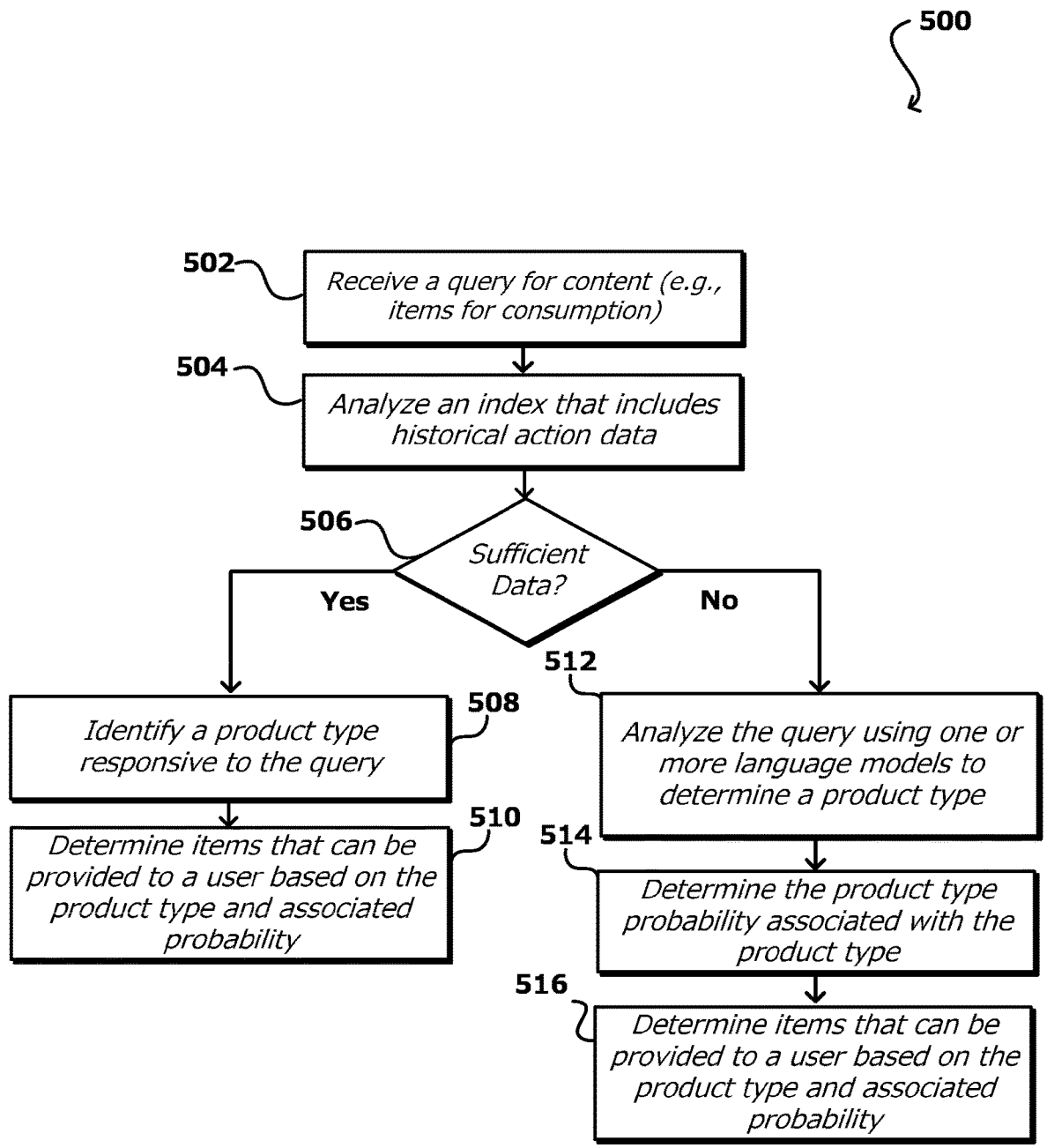
FIG. 5 illustrates an example process for determining items that can be provided to a user in accordance with various embodiments.

FIG. 5 illustrates an example process 500 for determining content to be provided for a user that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a query 502 is received for content (e.g., items for consumption) to be displayed on (or otherwise presented via) a computing device, in this case for a particular user of the computing device. In response to the query, a set of relevant content items can be determined, where that set can, in different embodiments, include some or all of the content that could be provided in response to the query. This can include, for example, a set of items and related information for the items in a product type category corresponding to the query. In order to determine which of the items to display, and/or the order or arrangement in which to display those items, the type of products intended by the query is determined. In this example, the query is received by an appropriate component, such as an item retrieval component. The item retrieval component includes one or more language models and a product type index.

The product type index can be analyzed 504, based at least in part on the query, to determine 506 whether there is sufficient historical action data for a particular query. For example, the query can be compared to a frequency threshold. As mentioned, the frequency threshold can be used to determine whether there is sufficient historical action data for a particular query. In the situation where the query satisfies the frequency threshold, the query can be compared to queries in a product type index. In the situation where a match is determined, the product type index can be used to identity 508 a product type responsive to the query. A probability associated with the product type can be identified and information about the product type as well as the associated probability can be used to determine 510 items that can be provided to a user. In one example, the information can be provided to a search engine that can retrieve items based at least in part on the query. In another example, the information can be provided to an item ranking function used to rank items for display.

In the situation where the query does not satisfies the frequency threshold (e.g., there is insufficient historical action data for the query), the query can be analyzed 512 using one or more language models to determine a product type responsive to the query. A probability associated with the product type can be determined 514. For example, the query can be segmented into word segments (e.g., three, two, and one word segments), and a product type and associated product type probability can be determined for each word segment. The product type probabilities can be combined to determine a total probability for the product type. The probabilities can be combined in any number of ways as is known in the art. For example, the probabilities can be combined using a log space function or other such function. As also described, a weighting factor can be associated with each of the word segments, and the probabilities can be combined taking into account the respective weighting factors. Thereafter, information associated with the product type can be utilized to determine 516 items to provide to the user. For example, the product type and associated probability can be used to rank or otherwise order the items such that items that are more likely to be purchased, or at least viewed, by the user are presented first, in order to enable the user to more quickly and easily locate content of interest. Such an approach can result in a greater likelihood of the user "clicking on" or otherwise selecting one of the items, as well as a greater likelihood of the user consuming (i.e., purchasing, renting, downloading, or otherwise obtaining) one of the items.

Figure 6:
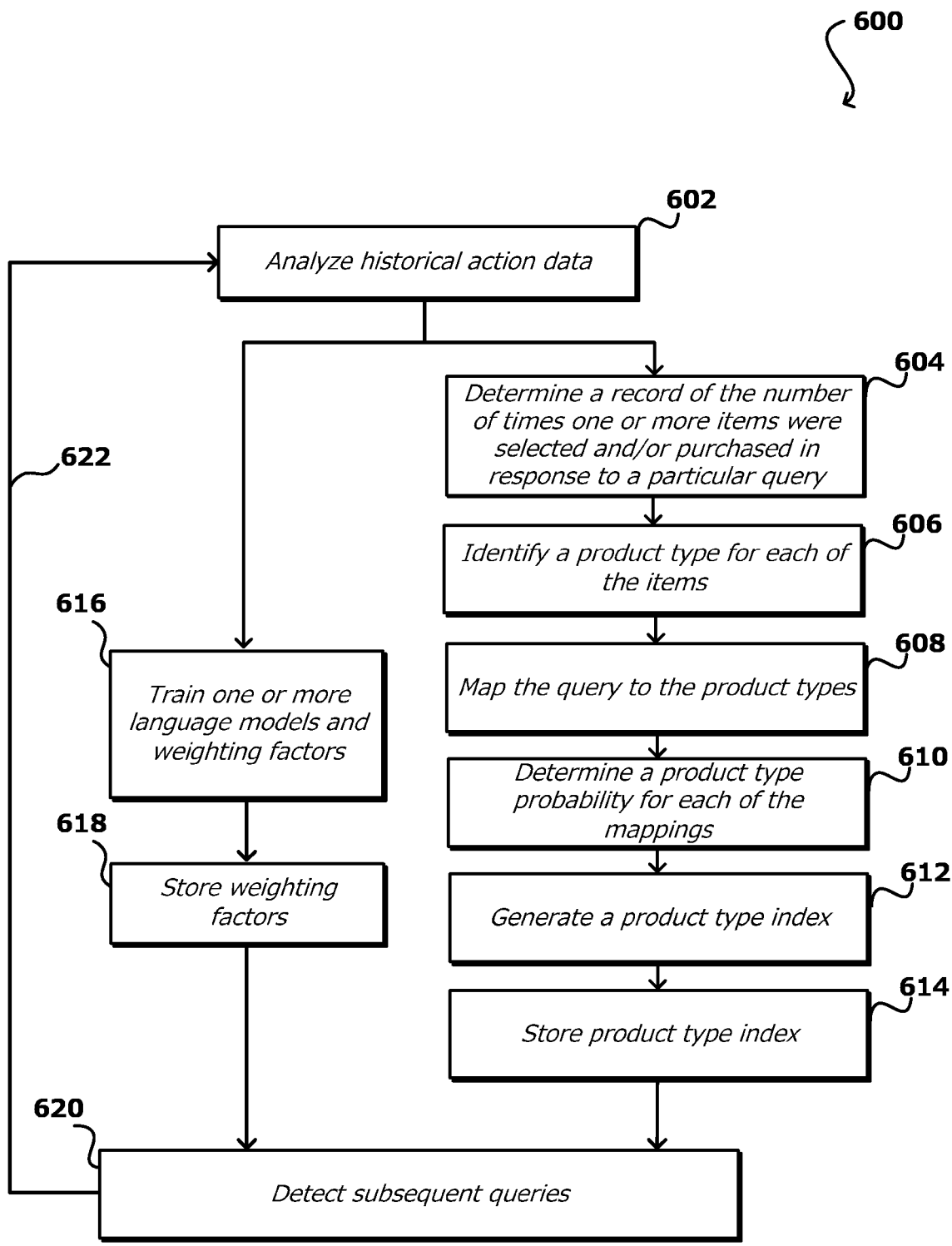
FIG. 6 illustrates an example process for training language models and generating a product type index in accordance with various embodiments.

FIG. 6 illustrates an example process for training language models and generating a product type index that can be used to identify content for various items based on a user's query in accordance with various embodiments. In this example, a modeling component or other such component is used to train one or more language models and generate a product type index. To generate the product type index or other similar index, historical action data is analyzed 602 to determine 604 a record of a number of times one or more items were selected and/or purchased in response to a particular query. Using the historical action data, a product type is identified 606 for each of the items selected and/or purchased and the query that caused the selection and/or purchase is mapped 608 to the appropriate product type. A product type probability is determined 610 for each mapping. The product type probability can include one of, or a combination of, a click probability and a purchase probability. As described, in the situation where just a click probability is determined (or used), the product type probability is based on the click probability. Similarly, in the situation where just a purchase probability is determined (or used), the product type probability is based on the purchase probability. In the situation where both probabilities are determined, the product type probability can be a combination of the two probabilities, where value of the click probability can be combined with the value of purchase probability in any number of ways. Additionally, each query can be associated with a frequency count. The frequency count can correspond to a number of items the query was performed. In situations where the frequency count for a query is below a frequency threshold, one or more language models can be used as described herein. Thereafter, the product type index can be generated 612 and stored 614 for later use.

Once the product type index is generated, a plurality of language models can be trained 616 and weighting factors can be determined based at least in part on the historical action data (e.g., information relating the data in the query log, the click log, and the purchase log) and stored 618 in at least one data store. A language model can be used to determine a probability of a product type for a given query. As will be apparent to persons of reasonable skill in the art, training a language model is well known and such approaches will not described further herein. A language model can be of any word length. Example language models include one word language models (unigram), two word language models (bigram), three word language models (trigram), etc. In accordance with various embodiments, as additional data is detected 620, such as actions with items (e.g., selecting and/or purchasing items), the product type index and/or language models can be updated 622. This can include, for example, repeating the steps (or at least some of the steps) in FIG. 6. It should be noted however, that in certain embodiments, the product type index and language models are updated after one of a predetermined number of queries is detected, a predetermined period of time, a combination thereof, or some other event or timing.

Figure 7:
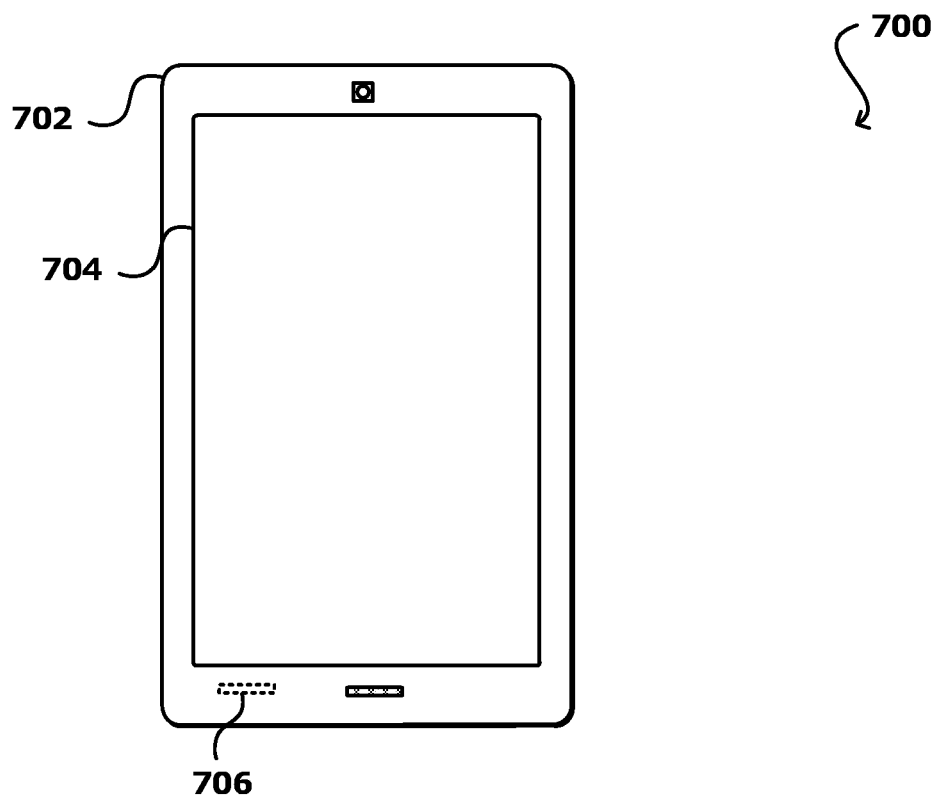
FIG. 7 illustrates an example computing device that can be utilized in accordance with various embodiments.

FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 8:
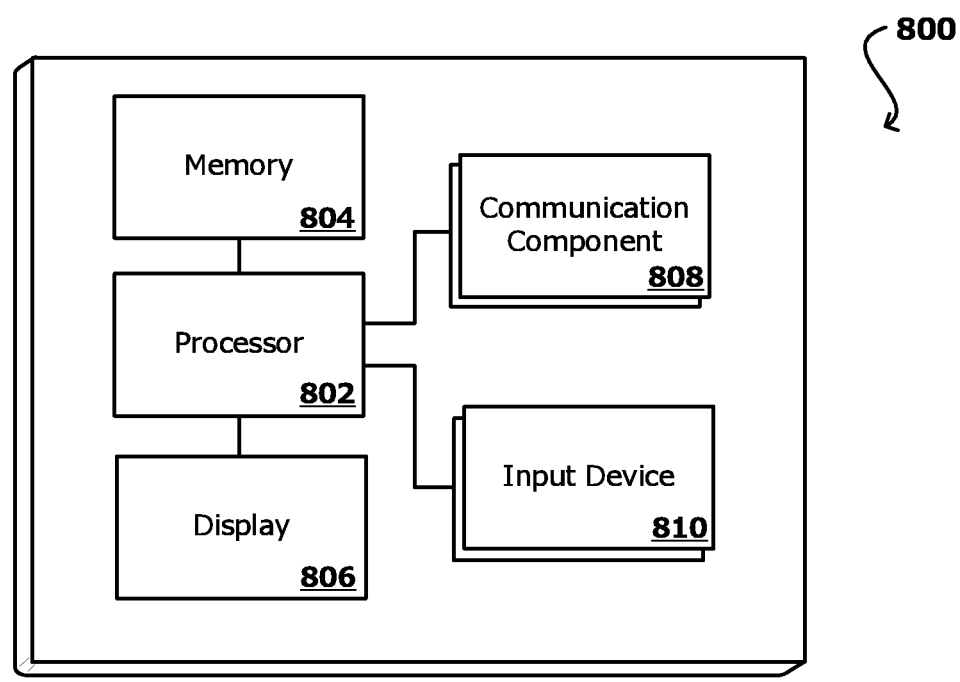
FIG. 8 illustrates an example configuration of components of a computing device, such as the device illustrated in FIG. 7.

In this example, the computing device 700 has a display screen 704 and an outer casing 702. The display screen under normal operation will display information to a user (or viewer) facing the display screen (e.g., on the same side of the computing device as the display screen). As discussed herein, the device can include one or more communication components 706, such as may include a cellular communications subsystem, Wi-Fi communications subsystem, BLUETOOTH® communication subsystem, and the like. FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. The device can include at least one communication component 808, as may enabled wired and/or wireless communication of voice and/or data signals, for example, over a network such as the Internet, a cellular network, a Wi-Fi network, BLUETOOTH®, and the like. The device can include at least one additional input device 810 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 9:
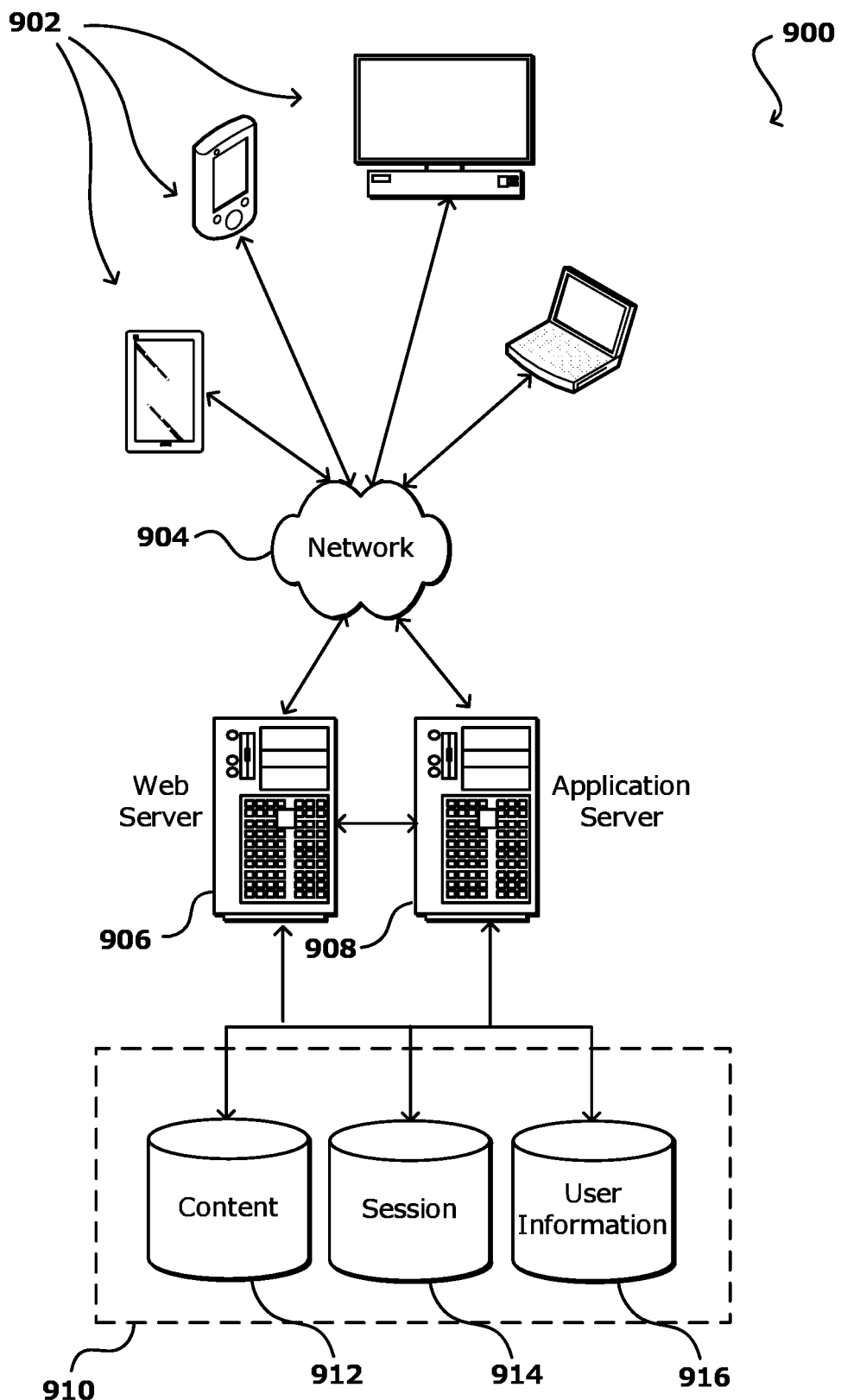
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A web-based computing device, comprising:
a computing device processor;
a memory device including instructions that, when executed by the computing device processor, cause the computing device to:
train, using one or more training queries and associated historical action data, a neural network, wherein the neural network is trained to determine one or more weighting factors of a language model, and wherein the weighting factors enable the language model to determine one or more product types and associated probabilities in response to receiving a given query and historical action data associated with the given query;
receive a query for an item provided via an electronic marketplace;
determine historical action data associated with the query;
determine that the historical action data associated with the query does not meet a frequency threshold;
determine, for the query and using the language model, one or more candidate product types, each with an associated product probability;
update an index that maps the query to at least one of the candidate product types and associated product probabilities;
receive a subsequent instance of the query from a client device;
determine that the query is associated with additional historical action data;
determine that the additional historical action data associated with the query meets a frequency threshold;

analyze the index to determine a plurality of product types based at least in part on the subsequent instance of the query; and provide a portion of items provided by the electronic marketplace for display by the client device based at least in part on at least one of the product types and associated product type probability.

2. The computing device of claim 1, wherein the instructions, when executed further enable the computing device to:

access a query log that includes information associated with a plurality of queries;

identify a first query of the plurality of queries, the first query associated with first historical action data and identifying a first item of a plurality of items provided by the electronic marketplace;

determine a first action associated with the first item based at least in part on the first historical action data;

determine a first product type of the first item;

determine a number of instances where the first query resulted in the first action for the first product type;

determine a total number of instances where the first query resulted in the first action;

determine a first product type probability of the first product type based at least in part on a ratio of the number of instances and the total number of instances; and associate the first product type probability with a mapping between the first query and the first product type.

3. The computing device of claim 1, wherein the historical action data for the query includes information for at least one of an item being selected in response to the query, an item being purchased in response to the query, or an item being placed in an electronic shopping cart.

4. The computing device of claim 1, wherein the instructions, when executed further enable the computing device to:

access a query log that includes information associated with a plurality of queries;

identify a first query of the plurality of queries that resulted in at least one of a first item associated with a first product type being selected in response to the first query or the first item associated with the first product type being purchased in response to the first query, the first query including a first set of words;

segment the query into query segments; and determine, using a machine learning algorithm, a first set of weighting factors based at least in part on the information associated with the plurality of queries, each weighting factor of the set of weighting factors being associated with a particular query segment of the query segments.

5. The computing device of claim 1, wherein the instructions, when executed to determine the portion of the items for display further enable the computing device to:

provide information including the at least one product type and associated product type probability to an item ranking function to determine a ranking score, the ranking score used to arrange a portion of the items for display.

6. The computing device of claim 1, wherein the instructions, when executed to analyze the index further enable the computing device to:

compare the query to a plurality of queries in a query log to identify a matching query;

identify a product type associated with the matching query; and identify a product type probability associated with the product type.

7. The computing device of claim 6, wherein the instructions, when executed further enable the computing device to:

provide the product type and associated product type probability to an item ranking function, the item ranking function used to generate a ranking score, the ranking score used in display of items associated with the product type.

8. The computing device of claim 6, wherein the instructions, when executed further enable the computing device to:

determine a first set of words in the query and a second set of words in the query;

determine a first product type probability for the first set of words based at least in part on a first language model;

determine a second product type probability for the second set of words based at least in part on a second language model; and combine the first product type probability and the second product type probability to determine a combined product type probability.

9. The computing device of claim 8, wherein the instructions, when executed to determine a first set of words further enable the computing device to:

determine a number of words in the query; and segment the number of words into at least one of one, two, or three word sets to generate the first set of words.

10. The computing device of claim 8, wherein combining the first product type probability and the second type probability includes using a linear weighting sum in log space.

11. The computing device of claim 8, wherein the instructions, when executed further enable the computing device to:

segment the second set of words into a third set of words that includes at least one of one, two, or three words;

determine a third product type probability for the third set of words; and combine the first product type probability, the second product type probability, and the third product type probability to determine a combined product type probability.

12. The computing device of claim 1, wherein each item is associated with a product document, the product document including structured text data that includes at least a product type field that indicates a product type associated with a respective item.

13. A method, comprising:

training, using one or more training queries and associated historical action data, a neural network, wherein the neural network is trained to determine one or more weighting factors of a language model, and wherein the language model receives a given query and historical action data associated with the given query, and determines one or more product types and associated probabilities of the one or more product types being associated with the given query;

receiving, by at least one web server, a query for an item provided via an electronic marketplace;

determining, by the at least one web server, historical action data associated with the query;

determining that the historical action data associated with the query does not meet a frequency threshold;

determining, for the query and using the language model, one or more candidate product types, each with an associated product probability;

updating, by the at least one web server, an index that maps the query to at least one of the candidate product types and associated product probabilities;

receiving, by the at least one web server, a subsequent instance of the query from a user computing device;

determining, by the at least one web server, that the query is associated with additional historical action data;

determining, by the at least one web server, that the additional historical action data associated with the query meets a frequency threshold;

analyzing, by the at least one web server, the index to determine a plurality of product types based at least in part on the subsequent instance of the query; and providing a portion of items provided by the electronic marketplace for display by the computing device based at least in part on at least one of the product types and associated product type probability.

14. The method of claim 13, further including:

accessing a query log that includes information associated with a plurality of queries;

identifying a first query of the plurality of queries, the first query associated with first historical action data and identifying a first item of a plurality of items provided by the electronic marketplace;

determining a first action associated with the first item based at least in part on the first historical action data;

determining a first product type of the first item;

determining a number of instances where the first query resulted in the first action for the first product type;

determining a total number of instances where the first query resulted in the first action;

determining a first product type probability of the first product type based at least in part on a ratio of the number of instances and the total number of instances; and associating the first product type probability with a mapping between the first query and the first product type.

15. The method of claim 13, further including:

accessing a query log that includes information associated with a plurality of queries;

identifying a first query of the plurality of queries that resulted in at least one of a first item associated with a first product type being selected in response to the first query or the first item associated with the first product type being purchased in response to the first query, the first query including a first set of words;

segmenting the query into query segments; and determining, using a machine learning algorithm, a first set of weighting factors based at least in part on the information associated with the plurality of queries, each weighting factor of the set of weighting factors being associated with a particular query segment of the query segments.

16. The method of claim 13, further comprising:

providing information including the at least one product type and associated product type probability to an item ranking function to determine a ranking score, the ranking score used to arrange a portion of the items for display.

17. The method of claim 13, further comprising:

comparing the query to a plurality of queries in a query log to identify a matching query;

identifying a product type associated with the matching query;

identifying a product type probability associated with the product type; and providing the product type and associated product type probability to an item ranking function, the item ranking function used to generate a ranking score, the ranking score used in display of items associated with the product type.

18. The method of claim 13, wherein the historical action data for the query includes information for at least one of an item being selected in response to the query, an item being purchased in response to the query, or an item being placed in an electronic shopping cart.

19. The method of claim 17, further comprising:

determining a first set of words in the query and a second set of words in the query;

determining a first product type probability for the first set of words based at least in part on a first language model;

determining a second product type probability for the second set of words based at least in part on a second language model; and combining the first product type probability and the second product type probability to determine a combined product type probability.

20. The method of claim 19, further comprising:

segmenting the second set of words into a third set of words that includes at least one of one, two, or three words;

determining a third product type probability for the third set of words; and combining the first product type probability, the second product type probability, and the third product type probability to determine a combined product type probability.

* * * * *